(12) United States Patent
O'Conor et al.

(10) Patent No.: US 9,350,873 B2
(45) Date of Patent: *May 24, 2016

(54) METHODS AND SYSTEMS FOR AUTOMATICALLY PROVIDING AN EMERGENCY SERVICE CALL HANDLER WITH CONTEXT SPECIFIC EMERGENCY SERVICE PROTOCOLS

(71) Applicant: Synergem Technologies, Inc., Greensboro, NC (US)

(72) Inventors: Stephen F. O'Conor, Melbourne, FL (US); Richard Maw, Dennis, MA (US)

(73) Assignee: Synergem Technologies, Inc., Greensboro, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/548,082

(22) Filed: Nov. 19, 2014

(65) Prior Publication Data

US 2015/0103982 A1    Apr. 16, 2015

Related U.S. Application Data

(63) Continuation of application No. 13/853,905, filed on Mar. 29, 2013, now Pat. No. 8,908,837.

(51) Int. Cl.
| | |
|---|---|
| H04M 11/04 | (2006.01) |
| H04M 3/51 | (2006.01) |
| G10L 15/08 | (2006.01) |
| H04M 3/22 | (2006.01) |

(52) U.S. Cl.
CPC ............... *H04M 11/04* (2013.01); *G10L 15/08* (2013.01); *H04M 3/2281* (2013.01); *H04M 3/5116* (2013.01); *H04M 2201/40* (2013.01); *H04M 2203/2038* (2013.01); *H04M 2242/04* (2013.01)

(58) Field of Classification Search
CPC . H04M 3/5116; H04M 2242/04; G10L 15/08
USPC .......................................................... 379/45
See application file for complete search history.

(56) References Cited

U.S. PATENT DOCUMENTS

| | | |
|---|---|---|
| 2007/0201664 A1 | 8/2007 | Salafia et al. |
| 2009/0252302 A1 | 10/2009 | Monroe |
| 2009/0276489 A1 | 11/2009 | Ragno et al. |
| 2014/0169534 A1 | 6/2014 | Bentley et al. |

*Primary Examiner* — Creighton Smith
(74) *Attorney, Agent, or Firm* — Lane Powell PC

(57) ABSTRACT

Computer media and methods for providing emergency services protocols to an emergency service call taker are disclosed herein. A public safety answering point receives an emergency service phone call from a caller. The caller is placed in voice communication with an emergency call handler. The system monitors the voice communication between the caller and the emergency call handler. In response to detecting one or more known keyword in the voice communication, the system provides the emergency call handler with one or more defined protocols for guiding additional communications between the caller and the emergency call handler.

17 Claims, 4 Drawing Sheets

METHODS AND SYSTEMS FOR AUTOMATICALLY PROVIDING AN EMERGENCY SERVICE CALL HANDLER WITH CONTEXT SPECIFIC EMERGENCY SERVICE PROTOCOLS

CROSS-REFERENCE TO RELATED APPLICATION

This application claims the benefit of co-pending and commonly owned U.S. patent application Ser. No. 13/853,905 filed Mar. 29, 2013, herein incorporated by reference in its entirety for all purposes.

BACKGROUND

A public safety answering point (PSAP), sometimes called "public safety access point", is a call center responsible for answering calls to an emergency telephone number for police, firefighting, and ambulance services. Trained emergency service call takers are typically responsible for obtaining relevant information from a caller and dispatching the appropriate emergency service resources to the appropriate location.

In order to assist the emergency call takers, many PSAPs utilize defined emergency service protocols (ESPs) for providing standard instructions for various types of common emergency service situations. For example, if a caller tells the call taker someone is not breathing, an appropriate ESP may guide the call taker through giving the caller instructions on performing CPR or other basic first aid procedures. Other protocols may be directed at how to obtain appropriate information from the caller. For example, if the call involves a bomb threat, an appropriate ESP may instruct the call taker to notify the bomb squad and fire department and give the call taker instructions on how to attempt to guide the conversation with the caller to obtain critical information. In conventional 9-1-1 systems, where the voice transmissions between a caller and call taker may be analog signals, and the call taker must know to recognize certain words or phrases spoken by a caller and look up any appropriate protocols. This additional step takes the call taker's attention away from dealing with the caller, and can cause delay and confusion which, in the context of an emergency services call, can lead directly to harm to individuals, damage to property, and/or additional, preventable consequences.

Advances in communication technology, specifically data connectivity and voice-over-IP technology, has led to the implementation of Enhanced-9-1-1 and Next Generation 9-1-1 standards. Broadly speaking, Next Generation 9-1-1 ("NG9-1-1") can be viewed as a system comprised of Emergency Services IP networks ("ESInets"), internet protocol ("IP") based software services and application, and various databases and data management processes that are all interconnected to a public safety answering point (PSAP). The NG9-1-1 system provides location-based routing to the appropriate emergency entity, such that a caller in need of help is automatically routed to the PSAP assigned to the caller's location. NG9-1-1 also provides standardized interfaces for call and message services, processes all types of emergency calls including non-voice (multimedia) messages, acquires and integrates additional data useful to call routing and handling for appropriate emergency entities. NG9-1-1 supports all legacy E9-1-1 features and functions and is intended to provide scalable solution for meeting current and emerging needs for emergency communication between callers and Public Safety entities.

The NG9-1-1 system architecture is defined by the National Emergency Number Association ("NENA") i3 standard and supports end-to-end IP connectivity between a caller and a public safety answering point (PSAP). The i3 standard defines an ESInet, which sits between various, non-emergency communications networks and one or more PSAPs, as well as the ESInet's various functional elements, such as a Location Information Server (LIS) and Location Validation Function (LVF), the Emergency Services Routing Proxy (ESRP) and Policy Routing Function (PRF) and the Emergency Call Routing Function and Location to Service Translation (LoST) protocol. All of these elements are designed to provide robust and secure communications between a variety of communications devices and emergency service providers.

The i3 standard requires all calls presented to the ESInet from an originating network, such as a typical telecommunications service provider ("TSP") network to use session initiation protocol ("SIP") signaling to deliver the call and include the location with the call. SIP is a signaling protocol used to start, change and end telephone and multimedia communication sessions over IP networks. Upon reaching the ESInet, call traffic encounters the Border Control Function (BCF) which sits between external networks and the ESInet. An emergency service call, with location information, enters the ESInet through the BCF. After passing through the BCF, the first element inside the ESInet is the Emergency Services Routing Proxy (ESRP). The ESRP receives the call, and passes this information to an Emergency Call Routing Function (ECRF), which determines the next hop in routing a call to the requested service. The ECRF maps the call's location information and requested service (e.g. police, which may be routed to a city-operated PSAP or fire department, which may be routed to a county-operated PSAP) to an appropriate PSAP.

In the event an ESInet is provisioned in an area before the regional TSPs and other originating networks or PSAPs are NG9-1-1 capable, NENA has defined a transition model. In this case, the legacy E911 network has been replaced by the Emergency Services IP Network (ESInet) with all of the functional elements previously described, but on either end (originating network and/or PSAP) is a legacy environment. To provide connectivity to both the legacy networks and the legacy PSAPs, NG9-1-1 defines a legacy network gateway and a legacy PSAP gateway to convert the data to and from SIP messaging for transmission over the ESInet until such time as the originating networks and PSAPs become i3 capable.

A beneficial side effect of the transition to the NG9-1-1 environment is that all emergency service phone calls will be converted to digital data and stored for future review. This further enables new and advantageous information processing techniques to be applied to emergency service calls in real time in order to assist emergency service call takers in performing their jobs.

BRIEF DESCRIPTION OF THE DRAWINGS

Various embodiments in accordance with the present disclosure will be described with reference to the drawings, in which.

DETAILED DESCRIPTION

This description discusses various illustrative embodiments of the present methods and systems for monitoring the content of an emergency service phone call and providing a call handler with context specific protocols ("the present methods and systems") with reference to the accompanying drawings in order to provide a person having ordinary skill in the relevant art with a full, clear, and concise description of the subject matter defined by the claims which follow, and to enable such a person to appreciate and understand how to make and use the same. However, this description should not be read to limit the scope of the claimed subject matter, nor does the presence of an embodiment in this description imply any preference of the described embodiment over any other embodiment, unless such a preference is explicitly identified herein. It is the claims, not this description or other sections of this document or the accompanying drawings, which define the scope of the subject matter to which the inventor and/or the inventor's assignee(s) claim exclusive rights.

Embodiments of the present methods and systems may be implemented by systems using one or more programmable digital computers. Computer and computer systems in connection with embodiments of the invention may act, e.g., as workstations and/or servers, such as described below. Digital voice and/or data networks such as may be used in connection with embodiments of the invention may also include components (e.g., routers, bridges, media gateways, etc.) with similar architectures, although they may be adapted, e.g., as known in the art, for their special purposes. Because of this commonality of architecture, such network components may be considered as computer systems and/or components of computer systems when consistent with the applicable context.

Figure 1:
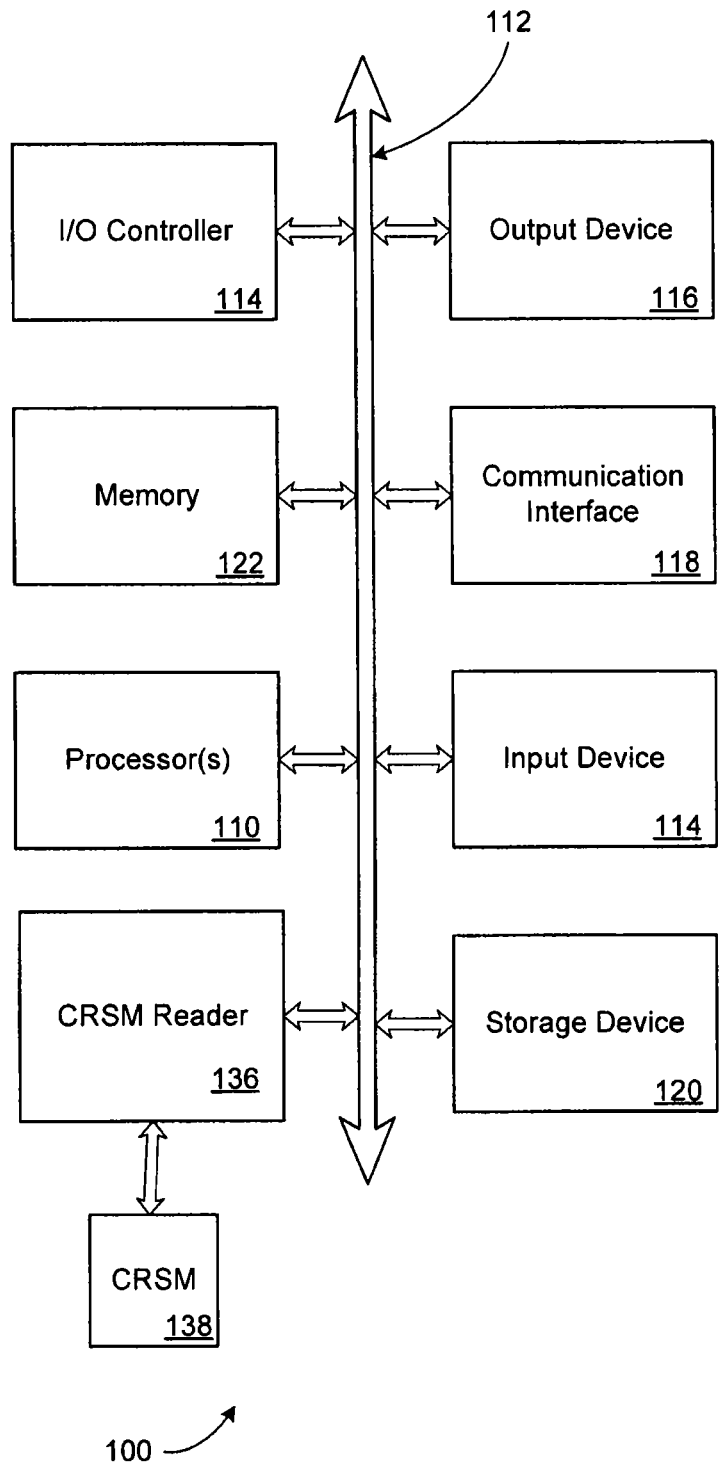
FIG. 1 is a schematic diagram depicting aspects of a non-limiting, exemplary computing architecture suitable for implementing at least some aspects and/or embodiments of the present systems and methods.

FIG. 1 depicts an example of one such computer system 100, which includes at least one processor 110, such as, e.g., an Intel or Advanced Micro Devices microprocessor, coupled to a communications channel or bus 112. The computer system 100 further includes at least one input device 114 such as, e.g., a keyboard, mouse, touch pad or screen, or other selection or pointing device, at least one output device 116 such as, e.g., an electronic display device, at least one communications interface 118, at least one data storage device 120 such as a magnetic disk or an optical disk, and memory 122 such as ROM and RAM, each coupled to the communications channel 112. The communications interface 118 may be coupled to a network (not depicted) such as the Internet.

Although the computer system 100 is shown in FIG. 1 to have only a single communications channel 112, a person skilled in the relevant arts will recognize that a computer system may have multiple channels (not depicted), including for example one or more busses, and that such channels may be interconnected, e.g., by one or more bridges. In such a configuration, components depicted in FIG. 1 as connected by a single channel 112 may interoperate, and may thereby be considered to be coupled to one another, despite being directly connected to different communications channels.

One skilled in the art will recognize that, although the data storage device 120 and memory 122 are depicted as different units, the data storage device 120 and memory 122 can be parts of the same unit or units, and that the functions of one can be shared in whole or in part by the other, e.g., as RAM disks, virtual memory, etc. It will also be appreciated that any particular computer may have multiple components of a given type, e.g., processors 110, input devices 114, communications interfaces 118, etc.

The data storage device 120 (FIG. 1) and/or memory 122 may store instructions executable by one or more processors or kinds of processors 110, data, or both. Some groups of instructions, possibly grouped with data, may make up one or more programs, which may include an operating system such as Microsoft Windows®, Linux®, Mac OS®, or Unix®. Other programs may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

One skilled in the art will recognize that the computer system 100 (FIG. 1) may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 136, such as, e.g., a magnetic disk drive, magneto-optical drive, optical disk drive, or flash drive, may be coupled to the communications channel 112 for reading from a CRSM 138 such as, e.g., a magnetic disk, a magneto-optical disk, an optical disk, or flash RAM. Alternatively, one or more CRSM readers may be coupled to the rest of the computer system 100, e.g., through a network interface (not depicted) or a communications interface 118. In any such configuration, however, the computer system 100 may receive programs and/or data via the CRSM reader 136. Further, it will be appreciated that the term "memory" herein is intended to include various types of suitable data storage media, whether permanent or temporary, including among other things the data storage device 120, the memory 122, and the CSRM 138.

The terms "computer-readable storage medium" and "computer-readable storage media" refer, respectively, to a medium and media capable of storing information. As such, both terms exclude transient propagating signals.

Two or more computer systems 100 (FIG. 1) may communicate, e.g., in one or more networks, via, e.g., their respective communications interfaces 118 and/or network interfaces (not depicted).

Figure 2:
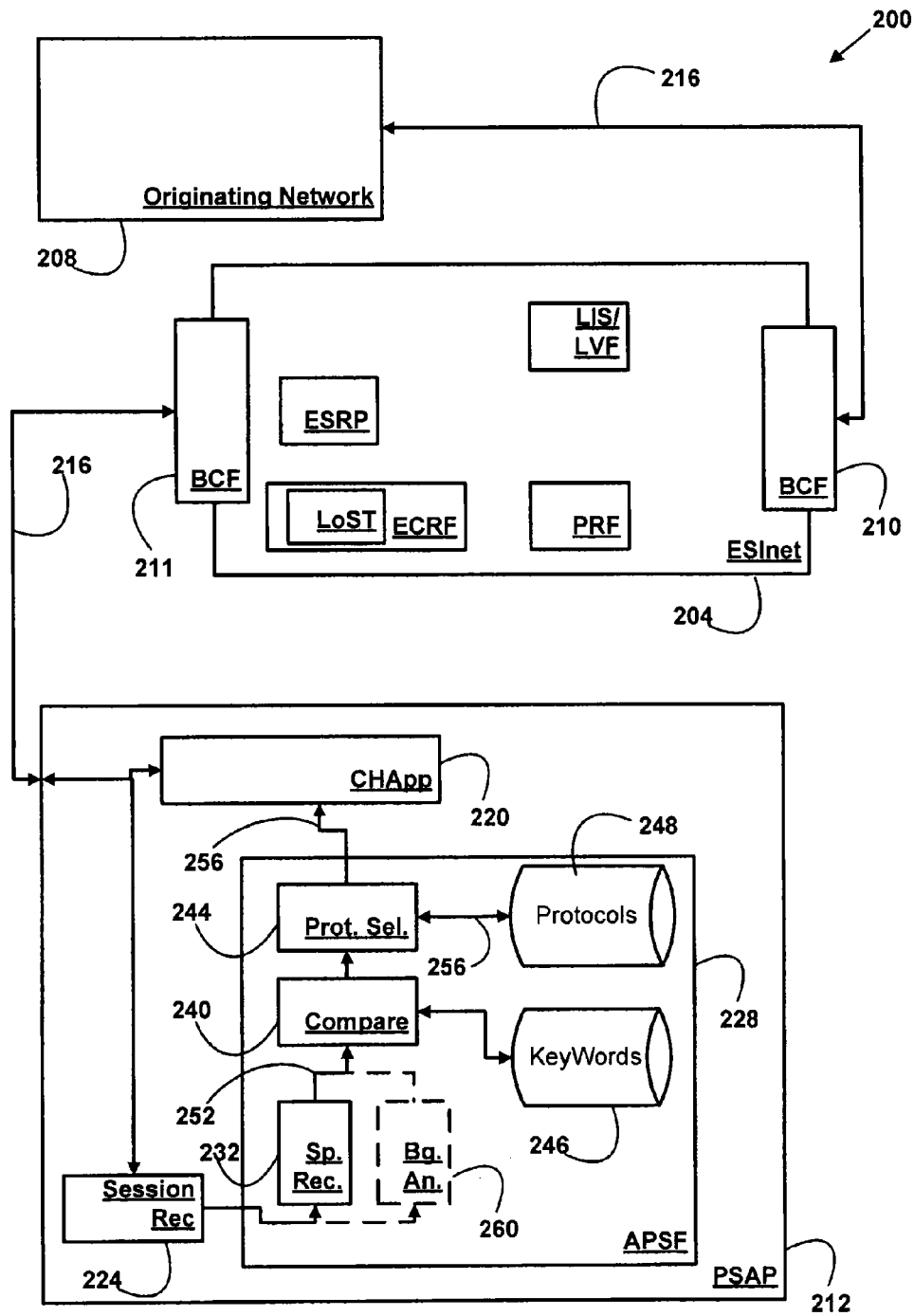
FIG. 2 is a functional block diagram depicting an emergency services communications network advantageously featuring aspects of the present methods and systems.

FIG. 2 depicts a communications system 200, including an ESInet 204 connected to an origination network 208 and a PSAP 212 via BCFs 210, 211, suitable for use with the present methods and systems. When an emergency voice call 216 is routed to the PSAP 212 from the origination network 208 via ESInet 204, the caller is connected to an emergency service call handler (not shown) via a call handling application 220. The call is also routed to a session recorder 224 for analysis, review and archival purposes.

In accordance with the present methods and systems, an automated protocol selection function (APSF) 228 is provided. As call 216 is being recorded by session recorder 224 it is also input to the APSF 228. The APSF 228 may include a speech recognition element 232, a comparison element 240, a protocol selection element 244, a keyword database 246, and a protocol database 248. Speech recognition element 232 may monitor the digital data transmission that corresponds to the voice communication between the caller and the emergency services call taker and apply a speech recognition process to detect words and/or phrases being spoken by the caller. For example, the speech recognition element 232 may divide the caller's speech into segments, which may be on the order of magnitude of a hundredth of a second in duration and compare the segments to a set of known phonemes. The speech recognition element 232 may then perform a contextual phoneme analysis on each phoneme identified in the call to other phonemes in its temporal vicinity in order to determine the language being spoken and identify what word or phrase in that language the caller is using. This may advantageously occur substantially in real-time, as the caller is speaking. Commercially available speech recognition solutions such as Microsoft Voice Command (Microsoft Corporation), Sonic Extractor (Digitial Syphon), LumenVox Speech Engine (LumenVox), Nuance Voice Control (Nuance Communications), VITO Voice2Go (Vito Technology), and Speereo Voice Translator (Speereo Software) are exemplary but non-limiting implementations of aspects of the speech recognition element 232.

After a word or phrase 252 is identified by the speech recognition element 232 it is passed to comparison element 240. Comparison element 240 compares the word or phrase 252 identified by speech recognition element 232 to a set of known keywords and phrases stored in keyword database 246. Each keyword and phrase in keyword database 246 is associated with one or more emergency service protocols 256 stored in protocol database 248. If comparison element 240 detects a match between the spoken word or phrase 252 and one of the known keywords or phrases, it notifies the protocol selection element 244. Protocol selection element 244 retrieves the appropriate emergency service protocol(s) 256 identified by the detected keyword or phrase and transmits the protocol 256 to the call handling application 220 where it is displayed to the emergency service call taker to assist him/her in handling the call.

For example, a caller may state, "Help, my wife isn't breathing!" Speech recognition element 232 will break this phrase down into the set of phonemes and, after running a contextual analysis, identify the individual words "Help," "my," "wife," "isn't," and "breathing." These words are then passed to the comparison element 240 which may compare the individual words and sub-sets of words within the phrase to the known key words and phrases stored in keyword database 246. The one such known phrase may be "isn't breathing," or variations thereof, and comparison element 240 will match that known phrase to the corresponding subset of words from the caller's statement. The phrase "isn't breathing" may be linked to an emergency service protocol on CPR instructions. The protocol selection element 244 may then retrieve the CPR protocol from protocol database 248 and display it for the emergency services call taker taking the call. Thus, the emergency services call taker can seamlessly provide instructions to the caller without having to stop, mentally process the statement, and look up the appropriate protocol him/herself.

If, however, the caller states, "Help, my baby isn't breathing!" the word "baby" may be detected in addition to "isn't breathing" and the protocol selection element may advantageously determine to provide the emergency service call taker with an infant specific CPR protocol.

Certain embodiments of the present methods and systems may advantageously filter the incoming call data to distinguish between foreground noise, i.e. the caller's voice, and background noise. The background noise may be separately analyzed by a background analysis element 260 for relevant information, such as the presence of sirens, alarms, additional voices, gun shots, explosions, etc. Detection of such information may also factor into the determination of the appropriate protocol to provide to the emergency service call handler.

Figure 3:
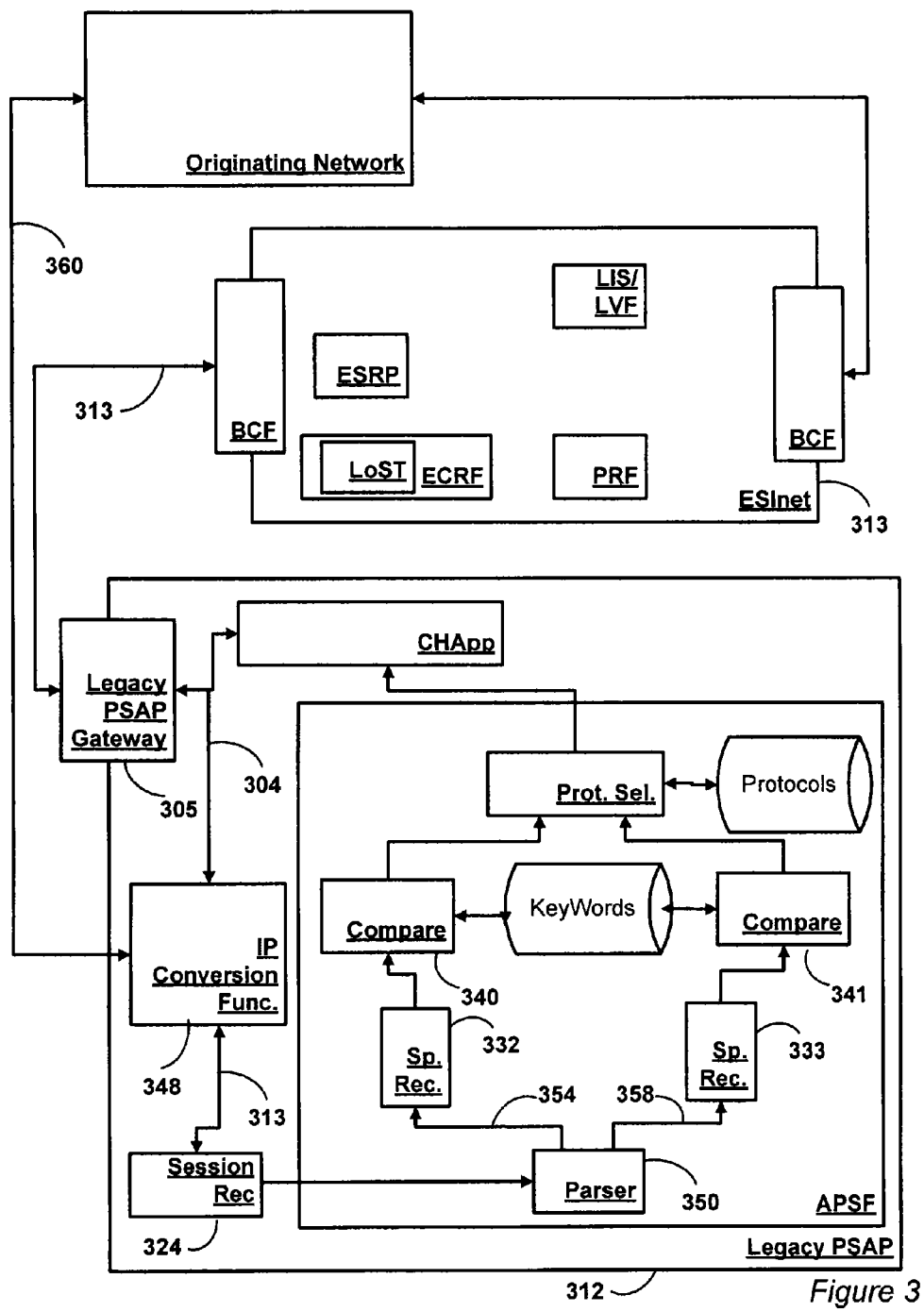
FIG. 3 is a functional block diagram depicting an emergency services communications network advantageously featuring additional aspects of the present methods and systems.

FIG. 3 depicts additional aspects of the present methods and systems, which may advantageously distinguish the caller's speech from the emergency service call taker's speech. For example, if the PSAP is a legacy PSAP 312, the digital IP data 313 transmitted by the ESInet 303 will be converted back to a legacy format 304 by a Legacy PSAP gateway function 305. In order to provide the functionality of the present methods and systems, the legacy formatted data 304 may be reconverted to IP data 313 by an IP conversion function 348 prior to being input to the session recorder 324. If the network transport path from the originating network to the legacy PSAP 312 is a legacy network (not depicted) rather than an ESInet, the data is delivered directly 360 to the IP conversion function 348 rather than the legacy PSAP gateway 305.

Still referring to FIG. 3, further alternative aspects of the present methods and systems may, prior to analysis by a speech recognition element, input the call data into a parsing element 350 in order to distinguish voice-data packets originating from the PSAP's IP address from voice-data packets originating from other IP addresses, thereby distinguishing the caller's speech 354 from the call taker's speech 358. In certain embodiments, the call taker's voice may be discarded and the protocol selection process may proceed as described above with reference to FIG. 2. Alternately, the separate instantiations of the speech recognition element 332, 333 may separately process the caller's speech 354 and the call taker's speech 358 and separate instantiations of the comparison element 340, 341 may compare identified words or phrases in the respective sides of the conversation to separate sets of keywords. Such an aspect of the present method and system may, for example, give the call taker the ability to call up emergency service protocols using voice commands in the context of the conversation with the caller.

Figure 4:
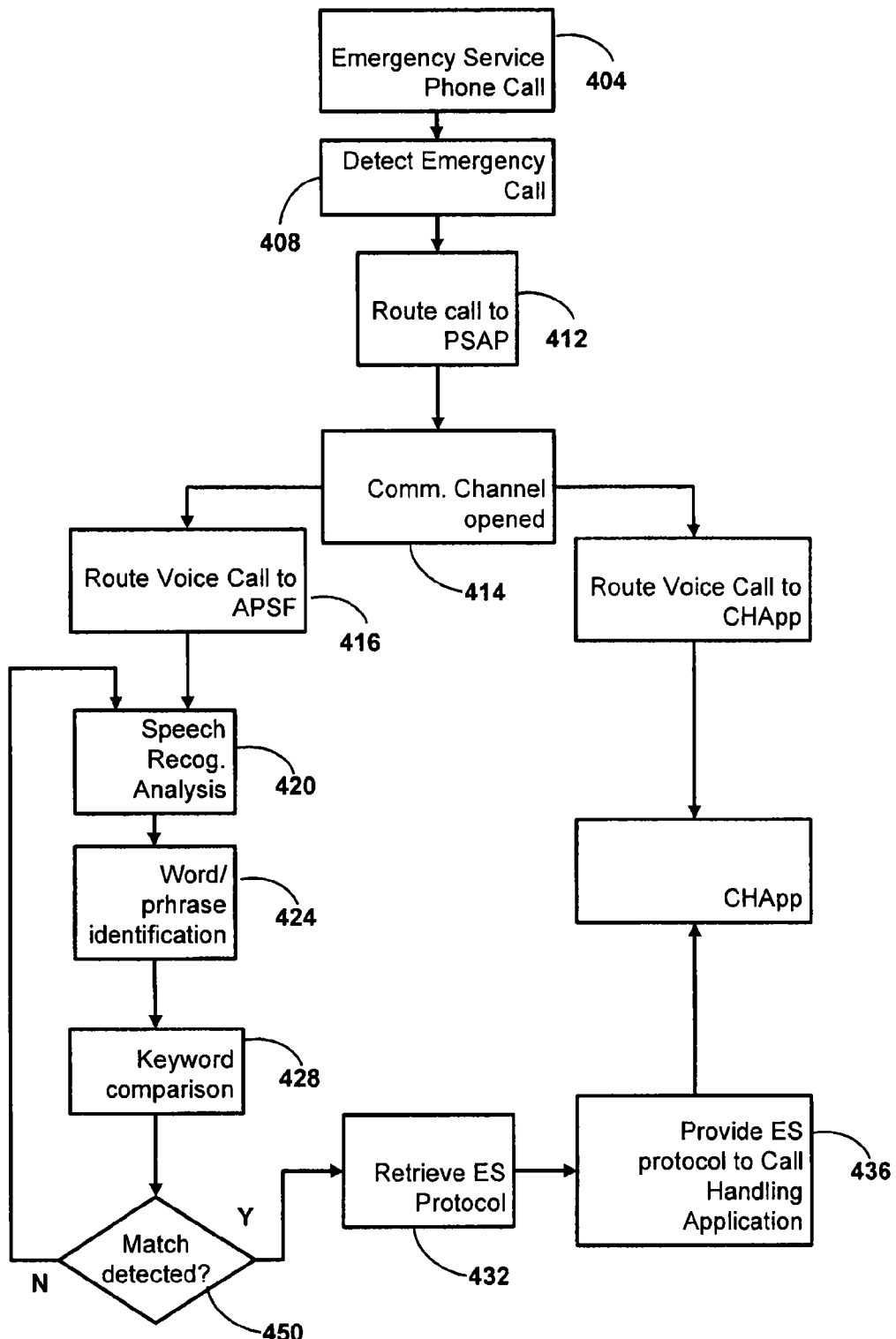
FIG. 4 is a flow chart depicting the operational steps of certain aspects of the present methods and systems.

FIG. 4 depicts the steps of certain embodiments of the present methods and systems. A caller initiates an emergency service phone call 404 via an originating communication network. The origination network detects that the call is an emergency service call and routes the call to a local transport network, such as an ESInet or a legacy network, 408. The call is then routed to the appropriate PSAP 412. A two way communication channel is opened 414 between the caller and an emergency service call handler at the PSAP and the digital data corresponding to the voice communication between the caller and the call handler is monitored by a session recorder and an APSF 416. The APSF performs a speech recognition analysis on the voice communication 420 and identifies particular words and/or phrases being spoken by the caller 424. The identified words and/or phrases are then compared to a known set of keywords 428. If a match is detected 450, the APSF retrieves an emergency service protocol associated with the matched keyword 432 and provides the protocol to the emergency service call handler 436.

It should be understood that the present methods and systems described above can be implemented in locally installed software applications, for example, substantially running on computing hardware at the PSAP. The present methods and systems could, however, also be implemented via a software as a service model, wherein the majority of computations are done at a remote location via network communications and the PSAP runs a 'lightweight' client application that predominately acts as an interface to the remote applications.

Exemplary embodiments of the present methods and systems have been described in detail above and in the accompanying figures for illustrative purposes. However, the scope of the present methods and systems are defined by the claims below and is not limited to the embodiments described above or depicted in the figures. Embodiments differing from those described and shown herein, but still within the scope of the defined methods and systems are envisioned by the inventors and will be apparent to persons having ordinary skill in the relevant art in view of this specification as a whole. The inventors intend for the defined methods and systems to be practiced other than as explicitly described herein. Accordingly, the defined methods and systems encompass all modifications and equivalents of the subject matter as permitted by applicable law.

That which is claimed is:

1. A non-transitory computer readable medium having computer-executable instructions stored thereon which, when executed by a computer, will cause the computer to perform a process for handling emergency services calls, the process comprising the steps of:
    monitoring digital data corresponding to a voice communication between a caller and an emergency service call handler for a digital representation of a known keyword;
    responsive to detection of said digital representation of said known keyword, providing said emergency call handler with a protocol for guiding additional communications between said caller and said emergency call handler;
    distinguishing between voice data corresponding to words spoken by said caller and voice data corresponding to said emergency service call handler; and
    selecting a first set of instructions for the protocol if said known keyword is identified as being spoken by said caller and selecting a second set of instructions for the protocol if said known keyword is identified as being spoken by said emergency service call handler.

2. The non-transitory computer readable medium of claim 1, wherein
    monitoring digital data corresponding to a voice communication between a caller and an emergency service call handler for a digital representation of a known keyword further comprises the steps of:
        performing a speech recognition analysis on said digital data to identify words being spoken during said voice communication, and
        comparing one or more of a set of known keywords to at least one word of the words identified using the speech recognition analysis to identify a word or words spoken during said voice communication; and
    the step of providing said emergency call handler with a protocol for guiding additional communications between said caller and said emergency call handler further comprises the steps of:
        selecting said protocol from a set of pre-defined protocols, and
        displaying said selected protocol to said emergency service call handler via a call handling application.

3. The non-transitory computer readable medium of claim 1, wherein:
    monitoring digital data corresponding to a voice communication between a caller and an emergency service call handler for a digital representation of a known keyword further comprises monitoring digital data corresponding to a voice communication between a caller and an emergency service call handler for a digital representation of a known key phrase;
    responding to detection of said digital representation of said known keyword by providing said emergency call handler with a protocol for guiding additional communications between said caller and said emergency call handler further comprises, responsive to detection of said digital representation of said known key phrase, providing said emergency call handler with a protocol for guiding additional communications between said caller and said emergency call handler; and
    selecting a first set of instructions for the protocol if said known keyword is identified as being spoken by said caller and selecting a second set of instructions for the protocol if said known keyword is identified as being spoken by said emergency service call handler further comprises selecting a first set of instructions for the protocol if said known key phrase is identified as being spoken by said caller and selecting a second set of instructions for the protocol if said known key phrase is identified as being spoken by said emergency service call handler.

4. The non-transitory computer readable medium of claim 1, wherein:
    selecting a first set of instructions for the protocol if said known keyword is identified as being spoken by said caller and selecting a second set of instructions for the protocol if said known keyword is identified as being spoken by said emergency service call handler further comprises giving priority to selecting the second set of instructions for the protocol if said known keyword is identified as being spoken by said emergency service call handler.

5. The non-transitory computer readable medium of claim 1, wherein:
    said digital data comprises a set of digital data divided into packets, wherein said packets include header information; and
    distinguishing between voice data corresponding to words spoken by said caller and voice data corresponding to said emergency service call handler further comprises comparing said header information for one or more packets to an IP address corresponding to said emergency service call handler.

6. The non-transitory computer readable medium of claim 1, wherein the process further includes the step of:
    comparing the digital data corresponding to said voice communication to a set of known background sounds; and
    selecting a first set of instructions for the protocol if said known keyword is identified as being spoken by said caller and selecting a second set of instructions for the protocol if said known keyword is identified as being spoken by said emergency service call handler further includes:
    selecting the first set of instructions based on said known keyword being spoken by said caller and said identified background sounds, and
    selecting the second set of instructions based on said known keyword being spoken by said emergency service call handler and said identified background sounds.

7. The non-transitory computer readable medium of claim 6, wherein the known keyword further comprises a known key phrase and the set of known keywords further includes known key phrases.

8. A non-transitory computer readable medium having computer-executable instructions stored thereon which, when executed by a computer, will cause the computer to perform a process for emergency call handling, the process comprising the steps of:

receiving a digital data stream corresponding to a voice communication between a caller and an emergency service call handler;

distinguishing between voice data corresponding to words spoken by said caller and voice data corresponding to said emergency service call handler; and selecting a first set of instructions for a protocol for handling the communication if a known word is identified as being spoken by said caller and selecting a second set of instructions for a protocol for handling the communication if the known word is identified as being spoken by said emergency service call handler.

9. The non-transitory computer readable medium of claim 8, wherein distinguishing between voice data corresponding to words spoken by said caller and voice data corresponding to said emergency service call handler further comprises comparing header information in a data packet to an IP address corresponding to said emergency service call handler to distinguish voice data corresponding to said emergency service call handler.

10. The non-transitory computer readable medium of claim 8, wherein selecting a first set of instructions for the protocol if a known word is identified as being spoken by said caller and selecting a second set of instructions for the protocol if the known word is identified as being spoken by said emergency service call handler further comprises selecting a first set of instructions if a known phrase is identified as being spoken by said caller and selecting a second set of instructions if the known phrase is identified as being spoken by said emergency service call handler.

11. The non-transitory computer readable medium of claim 8, wherein selecting a first set of instructions for the protocol if a known word is identified as being spoken by said caller and selecting a second set of instructions for the protocol if the known word is identified as being spoken by said emergency service call handler further comprises giving priority to selecting the second set of instructions for the protocol if the known word is identified as being spoken by said emergency service call handler.

12. The non-transitory computer readable medium of claim 8, wherein the process further includes the step of:

comparing the digital data stream of said voice communication to a set of known background sounds; and the step of selecting a first set of instructions for the protocol if said known keyword is identified as being spoken by said caller and selecting a second set of instructions for the protocol if said known keyword is identified as being spoken by said emergency service call handler further includes:

selecting the first set of instructions based on said known keyword spoken by said caller and said identified background sounds, and selecting the second set of instructions based on said known keyword spoken by said emergency service call handler and said identified background sounds.

13. A method for handling emergency services calls, comprising the steps of:

monitoring digital data corresponding to a voice communication between a caller and an emergency service call handler for a digital representation of a known key phrase;

responsive to detection of said digital representation of said known key phrase, providing said emergency call handler with a protocol for guiding additional communications between said caller and said emergency call handler;

distinguishing between voice data corresponding to words spoken by said caller and voice data corresponding to said emergency service call handler; and selecting a first set of instructions for the protocol if said known key phrase is identified as being spoken by said caller and selecting a second set of instructions for the protocol if said known key phrase is identified as being spoken by said emergency service call handler.

14. The method of claim 13, wherein:

monitoring digital data corresponding to a voice communication between a caller and an emergency service call handler for a digital representation of a known key phrase further comprises performing a speech recognition analysis on said digital data to identify words being spoken during said voice communication, and comparing a set of known key phrases to the identified words being spoken during said voice communication; and providing said emergency call handler with a protocol for guiding additional communications between said caller and said emergency call handler further comprises selecting said protocol from a set of pre-defined protocols, and displaying said selected protocol to said emergency service call handler via a call handling application.

15. The method of claim 13, wherein:

selecting a first set of instructions for the protocol if said known key phrase is identified as being spoken by said caller and selecting a second set of instructions for the protocol if said known key phrase is identified as being spoken by said emergency service call handler further comprises giving priority to selecting the second set of instructions if said known key phrase is identified as being spoken by said emergency service call handler.

16. The method of claim 13, wherein:

said digital data comprises a set of digital data divided into packets, wherein said packets include header information; and distinguishing between voice data corresponding to words spoken by said caller and voice data corresponding to said emergency service call handler further comprises comparing said header information for one or more packets to an IP address corresponding to said emergency service call handler.

17. The method of claim 13, the process further including:

comparing the digital data corresponding to said voice communication to a set of known background sounds to identify one or more of the background sounds; and wherein selecting a first set of instructions for the protocol if said known key phrase is identified as being spoken by said caller and selecting a second set of instructions for the protocol if said known key phrase is identified as being spoken by said emergency service call handler further includes selecting the first set of instructions for the protocol based on said known key phrase spoken by said caller and said identified background sounds, and selecting the second set of instructions for the protocol based on said known key phrase spoken by said emergency service call handler and said identified background sounds.

* * * * *